Aug. 20, 1968  R. R. JOHNSON  3,397,515
HOPPER VALVE FOR FILTER BAG INSTALLATION

Filed Oct. 23, 1965  3 Sheets-Sheet 1

INVENTOR.
ROBERT R. JOHNSON
BY
Kane, Dalsimer, Kane + Smith
ATTORNEYS

Aug. 20, 1968 R. R. JOHNSON 3,397,515
HOPPER VALVE FOR FILTER BAG INSTALLATION
Filed Oct. 23, 1965 3 Sheets-Sheet 2

INVENTOR.
ROBERT R. JOHNSON
BY
Kane, Dalsimer, Kane & Smith
ATTORNEYS

INVENTOR.
ROBERT R. JOHNSON
BY
Kane, Dalsimer, Kane & Smith
ATTORNEYS

United States Patent Office 3,397,515
Patented Aug. 20, 1968

3,397,515
HOPPER VALVE FOR FILTER BAG INSTALLATION
Robert R. Johnson, Troy, N.Y., assignor, by mesne assignments, to Research-Cottrell Inc., Bridgewater, N.J., a corporation of New Jersey
Filed Oct. 23, 1965, Ser. No. 503,657
1 Claim. (Cl. 55—302)

ABSTRACT OF THE DISCLOSURE

A dust collecting system consisting of a bag chamber, a plurality of filter bags disposed therein, means to clean the filter bags and discharging dust removed from said bags into a right circular cylindrical barrel having a vertically extending axis, first and second vertically spaced apart elliptical damper plates disposed within said barrel, each plate being pivotally mounted for rotation about its minor axis, the major axis of each plate when in its normally closed position defining an angle of 8° with the horizontal, said damper plates blocking passage of dust through said barrel when in closed position and providing a scraping action during movement from open to closed position, and first and second means for individually rotating said plates about their minor axis.

---

This invention relates to a valve for discharging dust from a dust collecting hopper in a filter bag installation while effectively maintaining a sealed installation.

In general, the type of dust collector to which this invention relates consists of a chamber having a series of tubular elements called "bags" suspended therein, each of which is closed at its upper end from which it is suspended and open at its lower end.

Air, gasses or smoke to be filtered are brought into the chamber and directed into the bags at their lower open ends which are fixed in position. The dust laden gasses are induced to flow up into the bags and through the walls thereof along the entire bag length and are then exhausted from the chamber to the atmosphere or to a gas recovery system. The dust or particles of impurities filtered from the gas by the bag walls is held and collected by the bag walls in between the threads of which the bags have been woven.

After an interval of time the bag walls have become so clogged with accumulated dust that the filtering operation must be halted to enable the bags to be cleaned. This is usually accomplished by shaking or vibrating the bag supports at the closed upper end of the bags from which end the bags are suspended or by depressurizing the chamber causing the walls of the bag to collapse and the dust to fall therefrom. In this manner the dust is shaken loose from the bag walls and falls through the lower open ends of the bags to a hopper disposed in the bottom of the chamber from which the dust can be removed. Generally, there are two or more dust collecting units provided so that one unit can be shut down for cleaning while another is in operation.

One of the major difficulties in the operation of such an installation is the removing of the dust from the dust collecting hopper while continuing to maintain operation, since it is necessary for proper operation to maintain a substantially sealed system.

It has been common practice in the art to use a rotary feeder to discharge material from the hopper. However, a rotary feeder will leak air after a short time and especially in view of the fact that the normal system is operated at temperatures up to 500° F. and pressures up to approximately 18 inches of water.

It is a principal object of this invention to provide a valve for discharging material from the hopper of a dust collecting installation which will not leak air after continued use and which will continue to maintain an effectively sealed system when the dust is not being discharged and which will not allow air to pass with the dust during the discharge of dust.

It is a further object of this invention to provide a valve for use in a filter bag installation which can be installed in systems presently in operation.

It is a further object of this invention to provide a hopper valve which will operate effectively for a considerable period of time without requiring replacement or reworking of parts.

A valve for discharging dust from a filter bag installation and the method of using the same is described herein with reference to the drawings in which.

Although the invention is described in an installation for filter bags in which it has primary use, there are other uses which may be made of the hopper valve which would be within the scope of the invention.

Figure 1:
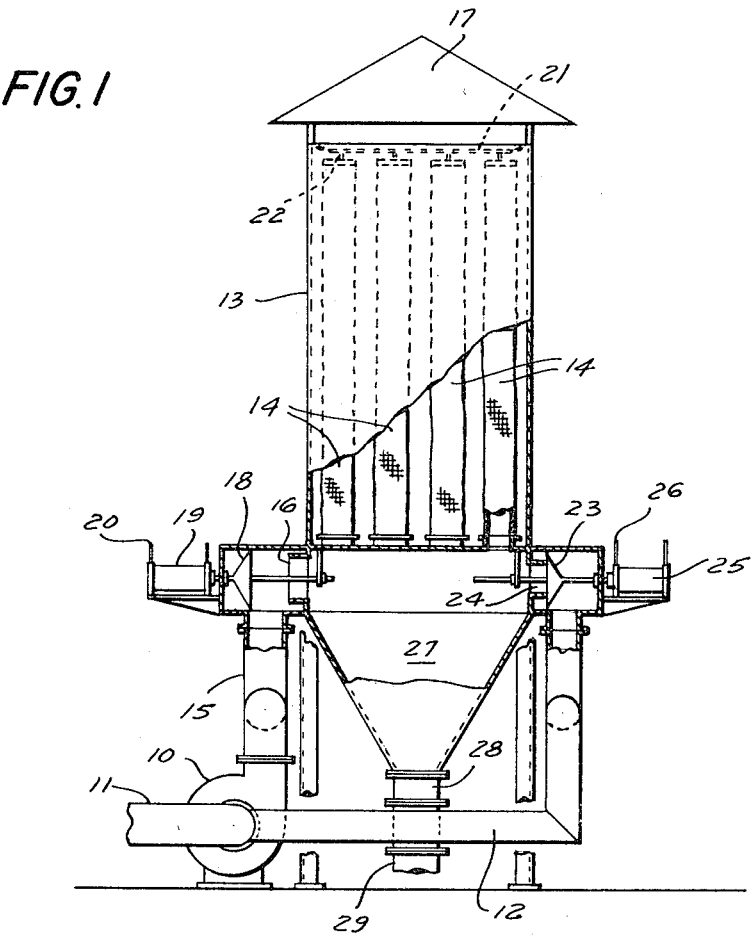
FIG. 1 is an end elevation, partly in section, showing a dust collecting device to which the invention is applied.

In FIG. 1 there is shown a representative type of dust collecting device or bag house operated under pressure. In this type of collection device the gas or air to be filtered is delivered to the unit under pressure by the blower 10. The suction side of the main supply blower 10 is duct 11, which has a branch duct 12 leading to one side of the collecting chamber 13 of which there are generally two or more provided. Here the gasses enter the bags 14 at the fixed lower open ends thereof.

The gas is blown into the collecting units 14 through the supply duct 15 into the entrance to chamber 13 at the opening 16. The clean filtered gas escapes to the atmosphere under the roof 17 of the bag house as shown. The supply opening 16 can be open or closed by uncovering the opening with the slide damper 18. The damper 18 is controlled by the air cylinder 19 which in turn can be controlled by an electric solenoid valve (not shown) in the air line 20.

The bags are supported within chamber 13 by hanging to the upper framework 21 with links 22.

When it becomes necessary to clean the filter bags 14 slide damper 18 is closed and slide damper 23 which is closed during the filtering operation is opened in what is known as the depressurizing opening 24 by the air cylinder 25. The air cylinder 25 is also controlled by an electric solenoid valve (not shown) or equivalent in the air line 26. This action reverses the air flow in the chamber 13 and in the filter bags 14 since the branch duct line 12 is opened to the suction side of the main supply blower 10 causing the filter bags 14 to collapse. The time period for the cleaning operation will vary depending on the application and type of dust and filter bags involved. For example, a cleaning period of 24 seconds. The dust collected due to the filtering action of the bags 14 is allowed to fall into dust collecting hopper 27. The hopper valve is shown in FIG. 1 in schematic and indicated by the numeral 28. Hopper valve 28 is positioned between the hopper 27 and the dust collecting line 29 through which the dust is removed.

Figure 2:
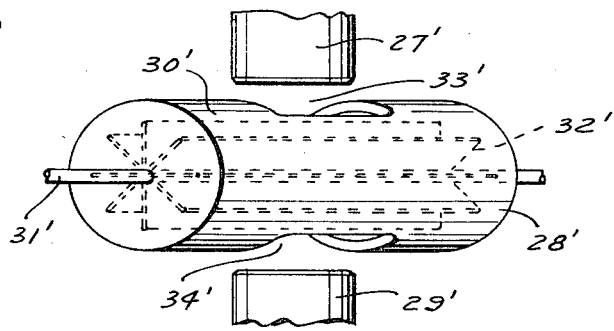
FIG. 2 is a perspective view with portions cut away of a rotary feeder of the type presently in use.

In FIG. 2 a prior art device which would be installed in the position of valve 28 in FIG. 1 is shown and indicated by the numeral 28'. The hopper is indicated by the numeral 27' and the dust removal line by the numeral 29'. The device as shown in FIG. 2 is known as a rotary feeder and consists of a stationary cylindrical casing 30' which is closed at each end and which encloses a portion of shaft 31' which projects therethrough axially and which supports within casing 30' six radially projecting elongated blades 32' which provide six longitudinal compartments which project radially. The blades are equally spaced from each other. Openings 33' and 34' are provided in the upper and lower portions of the casing 30' respectively.

In operation the device shown in FIG. 2 is installed with opening 33' directly below the outlet of hopper 27' and opening 34' directly above the opening of line 29'. The system is essentially a gravity feed system and as dust falls through the hopper 27' it is continually discharged into the rotary feeder 28'. Shaft 31' is continually rotating thereby rotating the blade 32' and the compartments provided between adjacent blades. As the dust is discharged from the hopper into the feeder 28' it falls into the compartment between blades 32' which appears beneath opening 33' and as the shaft 31' continues to rotate the compartment into which the dust had fallen moves into position above opening 34' where the dust leaves the compartment under the influence of gravity and enters line 29'.

Such a feed system as disclosed in FIG. 2 can operate satisfactorily for only a short period of time since an attempt is made to provide a seal between the outer edges of the blades 32' and the inner surface of casing 30'. In order to provide an effective seal initially the blade edges must touch the inner surface of the casing 30' and therefore upon rotation of the blades abrasion occurs forming spaces between the outer edge of the blades and the inner surface of casing 30' resulting in the losing of the seal in the system.

Hopper valve 28 which is utilized in this invention consists of three main parts—central barrel portion 35 and upper and lower barrel portions 36 and 37. Upper and lower barrel portions 36 and 37 respectively contain damper plates 38 and 39 fixedly mounted on damper shafts 40 and 41.

The central barrel portion and the upper and lower barrel portions are of uniform inside diameter and joined by bolts at flanges provided thereon. Hence in FIG. 3 flange 42 of upper barrel portion 36 is joined to flange 43 of central barrel portion 35 by bolts 44 and flange 45 of lower barrel portion 37 is joined to flange 46 of central barrel portion 35. Flanges 45 and 46 are also joined by bolts like bolts 44 but these bolts are not shown in the figures. The upper flange 47 of upper barrel portion 36 is joined to flange 48 of hopper 27 by bolts 49 and the lower flange 50 of lower barrel portion 37 is joined to flange 51 of line 29 by bolts which are not shown.

Figure 5:
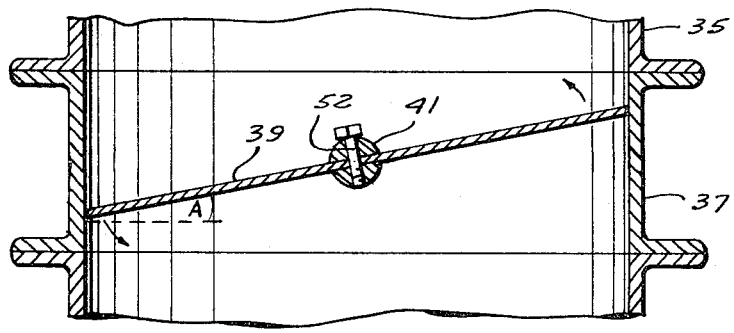
FIG. 5 is a partially sectional view taken along the line 5—5 in the direction of the arrows in FIG. 4.
Figure 4:
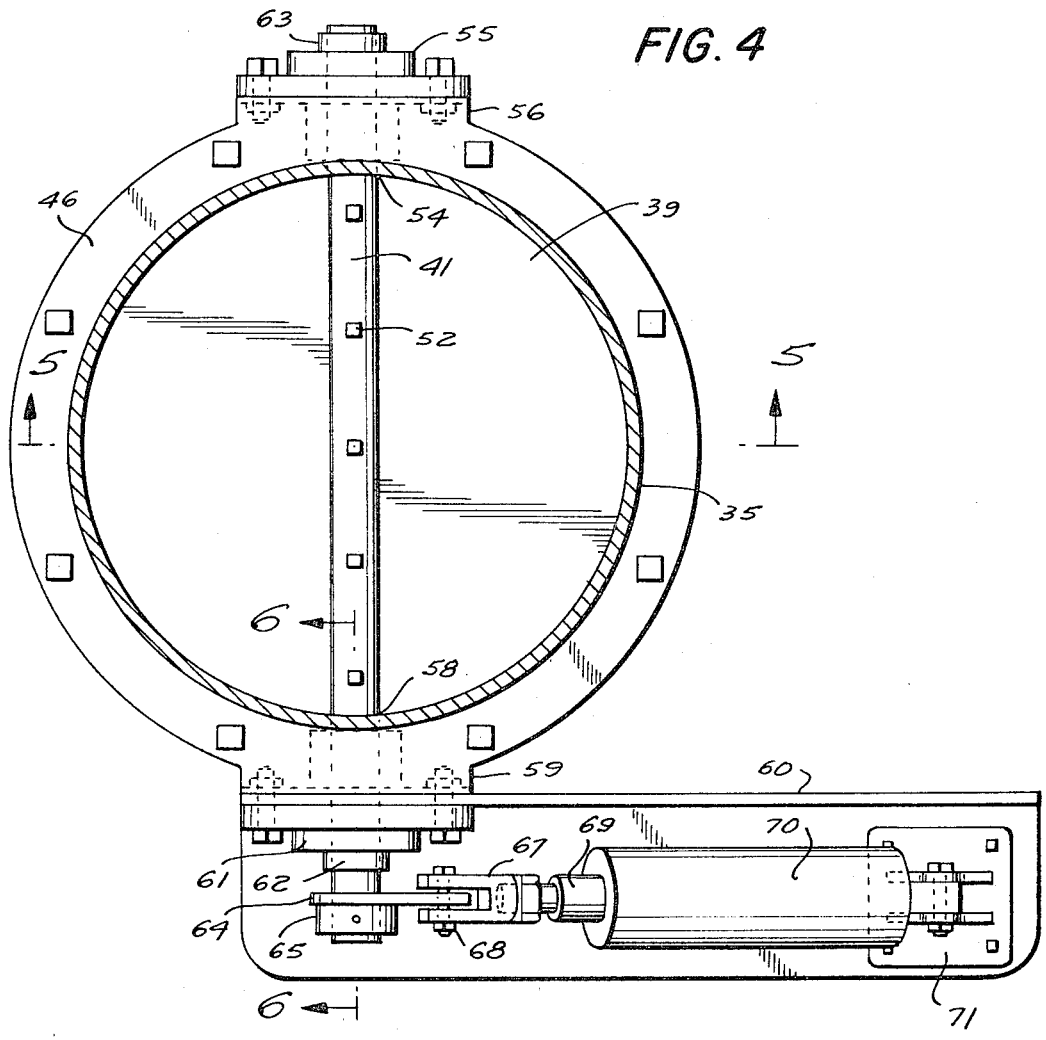
FIG. 4 is a partially sectional view taken along the line 4—4 of the direction of the arrows in FIG. 3.

Damper plate 39 is seen in detail in FIGS. 4 and 5 and the damper plate is rigidly fastened to shaft 41 by means of bolts 52. Likewise damper plate 38 is fastened to shaft 40 by bolts 53.

Although the barrel of the central barrel portion and the upper and lower barrel portions are circular, the damper plates 38 and 39 are not circular but are slightly elliptical.

Figure 3:
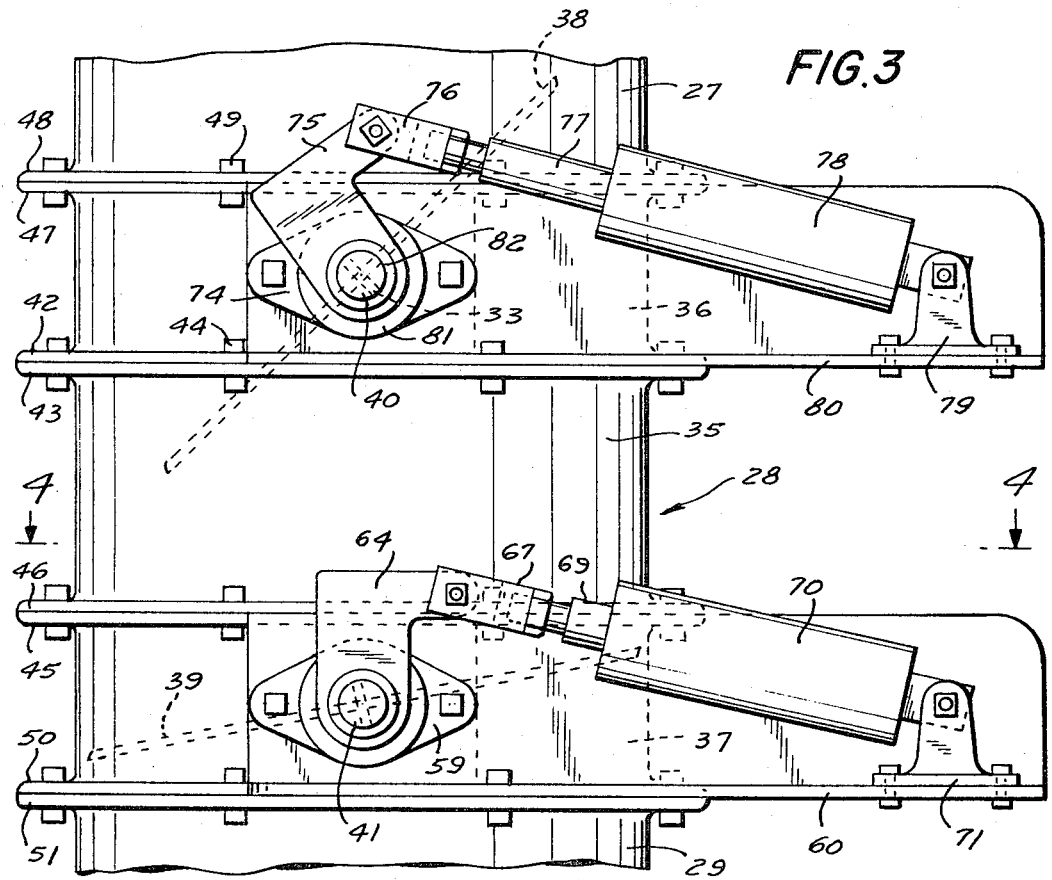
FIG. 3 is a side elevation of the hopper valve used in the installation shown in FIG. 1.

As viewed in FIG. 4, the minor axis of damper plate 39 extends along shaft 41 and is substantially equal to the inside diameter of lower barrel portion 37. The major axis of damper plate 39 is perpendicular to and bisects shaft 41. The major axis is slightly larger than the minor axis by an amount in the order of thousandths of inches in a 6 to 12 inch minor axis damper plate. Damper plate 38 is identical to damper plate 39. In its closed position each damper plate makes an angle of between 8° and 15° with the horizontal. In FIG. 3 the damper plate 39 is closed at an angle of 10° with the horizontal which is the preferred angle and this angle is indicated by the letter A.

Normally a valve having a flapper plate which is often referred to in the art as a butterfly valve will have the plate completely horizontal in the closed condition. In the subject application the valve is designed to operate under conditions of extreme heat and if the damper plate were horizontal it would upon expansion lock into position, bind and become inoperative since it could not be rocked about its axis for opening. If sufficient tolerance was provided between the periphery of a horizontal damper plate and the inner surface of the barrel under certain conditions and prior to extreme expansion there would be no seal provided between the periphery of the damper plate and the inside surface of the barrel. Hence with an angle provided there is room for expansion without binding. The elliptical configuration aids in this. That is, the provision of a seal under conditions of less than extreme heat and a non-binding condition under conditions of extreme heat.

The barrel portions 36 and 37 are machined and the damper plates 38 and 39 are also machined in order to fit the barrels in the proper manner.

Figure 6:
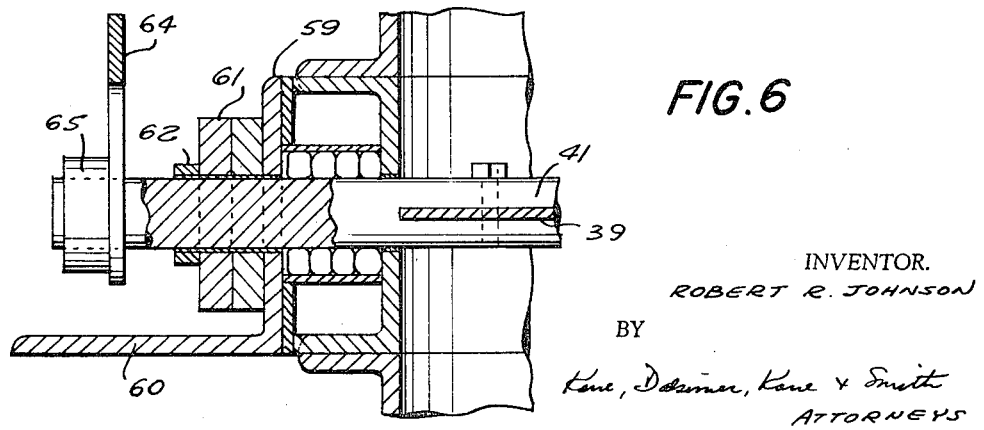
FIG. 6 is a partially sectional view taken along the line 6—6 in the direction of the arrows in FIG. 4.

In FIGS. 4, 5 and 6 damper plate 39 is shown in detail. One end of damper plate support shaft 41 extends through hole 54 in barrel 37 and is supported in sealed bearing 55 which is external to the barrel and mounted on bracket 56 seal welded to barrel 37. The end of support shaft 40 for damper 38 is supported externally in the same manner. However, this does not appear in the figures.

The remaining end of shaft 41 extends through hole 58 diametrically opposite hole 54.

Shaft 41 is supported by bracket 59 and bracket 59 also supports piston support bracket 60. Sealed bearing 61 like bearing 55 is supported by the bracket 59 so that the end of shaft 41 can be maintained therein. The bearing is held in position by set collar 62 and the bearing 55 is also held in position by a set collar indicated by the numeral 63 so that the shaft will not move longitudinally. As observed in FIG. 4, arm 64 is rigidly attached to shaft 41 and held from longitudinal movement of shaft 41 by collar 65.

The free end of arm 64 is pivotally engaged with rod clevis 67 by means of pin 68. Rod clevis 67 is attached to piston 69 of air cylinder 70 which is pivotally supported by bracket 71 on piston support bracket 60. The shaft 41 is supported in bracket 59 within packing 72 which is surrounded by tubing 73.

The damper plate 38 is supported within the upper barrel 36 in exactly the same way and in FIG. 3 there appears bracket 74 corresponding to bracket 59, lever arm 75 corresponding to lever arm 64, rod clevis 76 corresponding to rod clevis 67, piston 77 corresponding to piston 69, air cylinder 78 corresponding to air cylinder 70, bracket 79 corresponding to bracket 71, piston support bracket 80 corresponding to piston support bracket 60, bearing 81 corresponding to bearing 61 and collar 82 corresponding to collar 65.

In operation dust from the hopper collects on the upper surface of the closed damper plate 38 and after a predetermined time through the operation of air cylinder 78 damper plate 38 is rocked to the open position and the dust on the upper surface thereof is allowed to drop into the central barrel section between the upper and lower damper plates and on the upper surface of damper plate 39. Air cylinder 78 then causes damper plate 38 to rock to the closed condition and after an interval air cylinder 70 rocks damper plate 39 to an open condition and damper plate 39 is left in the open condition for a predetermined time. When the damper plate 39 is in the open condition the dust is allowed to be discharged from the valve through the force of gravity. Since a metal to metal seal is used, that is, the damper plates and the barrel are metal, the valve under certain conditions of pressure does not provide an absolute air seal of itself. However, the dust which rests on the damper plate creates a seal to any air flow which could pass between the damper plate and the barrel. With the aid of the dust this valve becomes an absolute seal and discharge valve. Hence when the dust is on the upper surface of upper damper plate 38 a seal is provided and when the dust is on the upper surface of the lower damper plate a seal is provided.

Thus, among others, the several objects of the invention, as specifically aforenoted, are achieved. Obviously, numerous changes in construction and rearrangement of the parts may be resorted to without departing from the spirit of the invention as defined by the claim.

I claim:

1. In a dust collecting system consisting of a bag chamber, a plurality of filter bags suspended within said chamber in parallel disposed relationship with their longitudinal axes substantially vertical, open bottoms of said bags, a dust collecting hopper beneath said chamber, supply and depressurizing openings formed in the sides of said chamber below said bag bottoms, a horizontal plate above said supply and depressurizing openings separating said bags from said dust collecting hopper and said supply and depressurizing opening, a plurality of openings in said plate allowing communication of the interior of respective bags through said open ends thereof with said dust collecting hopper and said supply and depressurizing openings, a filtering cycle, a cleaning cycle, means for closing said depressurizing opening and opening said supply opening during said filtering cycle whereby gas to be filtered can enter said filter bags through said supply opening and the openings in said horizontal plate, means for closing said supply opening and opening said depressurizing opening during said cleaning cycle to enable dust collected on the inside of said bags during said filtering cycle to fall freely under the influence of gravity into said dust collecting hopper, means for freeing dust within said filter bags during said cleaning cycle, a discharge of said dust collecting hopper for discharging dust therefrom under the influence of gravity, a right circular cylindrical barrel having a vertically extending cylindrical axis and disposed beneath said hopper for receiving said dust discharged therefrom by gravity and defining two valve seats, first and second vertically spaced elliptical damper plates within said barrel and seated in a respective one of said valve seats when in closed position, first and second damper plate support shafts respectively rockingly supporting said damper plates in a normally closed position with the major axis of each of said damper plates forming an 8° angle with the horizontal, said damper plates blocking passage of dust in the closed position and providing a scraping action during movement from open to closed position, first and second lever arms attached respectively to said first and second damper plate support shafts externally of said barrel, first and second pneumatic cylinder and piston means attached respectively to said first and second lever arms for individually and positively rocking said damper plates to allow passage of dust due to force of gravity, first and second activating means for respectively activating said first and second cylinder and piston means whereby said first damper plates can be rocked to allow passage of dust to said second damper plate when said second damper plate is in the closed position and said second damper plate can be rocked to allow passage of dust when said first damper plate is in the closed position.

References Cited

UNITED STATES PATENTS

| 516,171 | 3/1894 | Wilson | 55—341 |
|---|---|---|---|
| 1,444,384 | 2/1923 | Patitz | 55—433 X |
| 1,617,073 | 2/1927 | Matlock | 55—341 X |
| 1,974,952 | 9/1934 | Eiber | 55—341 |
| 2,138,098 | 11/1938 | Holmes | 251—305 X |
| 2,552,117 | 5/1951 | Roswell | 251—308 |
| 2,708,489 | 5/1955 | Stokoe | 55—432 X |
| 2,805,732 | 9/1957 | Martinez | 55—341 X |
| 2,833,511 | 5/1958 | Fletcher | 251—298 X |
| 2,835,268 | 5/1958 | Dillberg et al. | 251—305 X |
| 3,057,137 | 10/1962 | Perlis et al. | 55—341 X |
| 3,097,936 | 7/1963 | Lincoln | 55—283 X |
| 3,146,080 | 8/1964 | Ruble et al. | 55—302 X |
| 1,449,857 | 3/1923 | Hay | 55—283 X |
| 2,964,129 | 12/1960 | Lobbe | 55—293 X |
| 3,273,317 | 9/1966 | Vicard | 55—103 |

FOREIGN PATENTS

| 240,931 | 10/1962 | Australia. |
|---|---|---|
| 509,838 | 2/1955 | Canada. |
| 838,589 | 12/1938 | France. |
| 394,893 | 5/1924 | Germany. |
| 762,598 | 11/1956 | Great Britain. |
| 59,658 | 4/1912 | Switzerland. |

HARRY B. THORNTON, *Primary Examiner.*

D. TALBERT, *Assistant Examiner.*